(12) United States Patent
Wagner

(10) Patent No.: US 11,623,352 B2
(45) Date of Patent: Apr. 11, 2023

(54) AUTOMATED BAG GRIPPING DEVICE

(71) Applicant: JLS Automation, York, PA (US)

(72) Inventor: Corey Wagner, Glen Rock, PA (US)

(73) Assignee: JLS Automation, York, PA (US)

( * ) Notice: Subject to any disclaimer, the term of this patent is extended or adjusted under 35 U.S.C. 154(b) by 216 days.

(21) Appl. No.: 16/910,907

(22) Filed: Jun. 24, 2020

(65) Prior Publication Data

US 2021/0402618 A1 Dec. 30, 2021

(51) Int. Cl.
| | |
|---|---|
| *B25J 15/00* | (2006.01) |
| *B25J 15/06* | (2006.01) |
| *B65B 43/46* | (2006.01) |
| *B25J 9/10* | (2006.01) |
| *B65G 47/91* | (2006.01) |
| *B25J 11/00* | (2006.01) |
| *B65G 47/90* | (2006.01) |

(52) U.S. Cl.
CPC ............ *B25J 15/0066* (2013.01); *B25J 9/10* (2013.01); *B25J 15/0028* (2013.01); *B25J 15/0683* (2013.01); *B65B 43/46* (2013.01); *B25J 11/0045* (2013.01); *B65G 47/907* (2013.01); *B65G 47/91* (2013.01)

(58) Field of Classification Search
CPC ......................... B25J 15/0066; B25J 15/0028; B25J 15/0683; B25J 15/024; B25J 15/0616; B25J 15/0061; B25J 9/10; B25J 11/0045; B65B 43/46; B65B 35/18; B65G 47/907; B65G 47/91; B65G 47/918; B65G 2201/0238
See application file for complete search history.

(56) References Cited

U.S. PATENT DOCUMENTS

| | | | | |
|---|---|---|---|---|
| 4,685,714 A | * | 8/1987 | Hoke | B66C 1/0243 294/81.2 |
| 4,723,353 A | * | 2/1988 | Monforte | B25J 15/0052 414/737 |
| 5,024,575 A | * | 6/1991 | Anderson | B65G 47/90 414/737 |
| 7,017,961 B1 | * | 3/2006 | Parnell | B25J 15/0616 294/2 |
| 8,414,042 B2 | * | 4/2013 | Landes | B65G 47/90 294/67.31 |
| 9,156,570 B2 | * | 10/2015 | Lomerson, Jr. | B66C 1/58 |
| 2006/0045721 A1 | * | 3/2006 | de Koning | B65G 47/91 414/751.1 |
| 2009/0320417 A1 | * | 12/2009 | Gilmore | B65G 47/90 53/235 |

FOREIGN PATENT DOCUMENTS

EP 2168892 A1 * 3/2010 .......... B25J 11/0045

* cited by examiner

*Primary Examiner* — Stephen A Vu
(74) *Attorney, Agent, or Firm* — Barley Snyder

(57) ABSTRACT

A robotically-operated gripping device is provided and includes a frame assembly, a vacuum device, a clamping device, and a robotic arm. The vacuum device is connected to the frame assembly and configured to selectively attach to and position at least a portion of an object. The clamping device is connected to the frame assembly and provided for selectively clamping the object attached to the vacuum device. The robotic arm is connected to the frame assembly and provided for selectively positioning the vacuum device and the gripping device.

10 Claims, 12 Drawing Sheets

AUTOMATED BAG GRIPPING DEVICE

FIELD OF THE INVENTION

The present invention relates to a bag gripping device, and more particularly, to a bag gripping device configured for use with a robotic arm.

BACKGROUND

Flexible containers, for example storage bags, are commonly handled by mechanical devices in facilities in high volumes and at rapid speeds. Such facilities may include a food manufacturing plant, a restaurant, or other distribution or handling facilities. An inherent problem with known handling devices is that for flexible bags that are difficult to grasp, damage may occur due to the application of too great a pressure or force on the product. These bags are not generally mechanically strong or resilient to compressive forces, or become shapened in such a way that makes them difficult to grasp. The bags are often non-uniform in shape, and have different surface textures or levels of lubricity.

Likewise, when bags experience excessive handling, product defects occur such as tearing, compaction, and crushing, and the end result may be that the food product in the bag is unusable for its intended purpose. Such bag handling concerns result in unacceptable amounts of product waste or damaged product as a result of the state of the art handling. On a commercial scale, such product handling challenges create inefficiency and increased manufacturing cost. What is needed is a gripping device that permits bags filled with product, such as food, to be quickly and efficiently handled while minimizing damaged or lost food product due to handling difficulties.

Furthermore, industries of all types are using robotic techniques for reasons of efficiency, precision, sanitation and productivity. In the food industry, and particularly in the field of processed foods, robotics are of use in moving foods from one part of a production stream to another and ultimately into suitable packaging. However, known robotic tools have proved inadequate to the handling of flexible packaging, such as bags. Known devices have not provided sufficiently delicate handling which results in wasted product and increased costs to the manufacturer.

Therefore, there is a need for an automated bag gripping device that permits the handling of flexible packaging for food products in a way that maintains the integrity and appearance of the packaging.

SUMMARY

A robotically-operated gripping device according to the present disclosure includes a vacuum device configured to selectively attach to and position at least a portion of an object, such as a bag of a food product. A clamping device is provided for selectively clamping the object once attached and positioned by the vacuum device. A robotic arm is provide for selectively positioning the vacuum device and the gripping device as a single unit.

In another embodiment, a system for transporting an object, such as a flexible bag and associated product, is provided. The system generally includes a vacuum element having a suction end. The suction end is moveable from a first position to a second position in response to a negative pressure supplied thereto. The system further includes a clamping device having a pair of opposable clamping arms. The clamping arms are configured to selectively clamp a portion of the object when the suction end of the vacuum element is in the second position.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
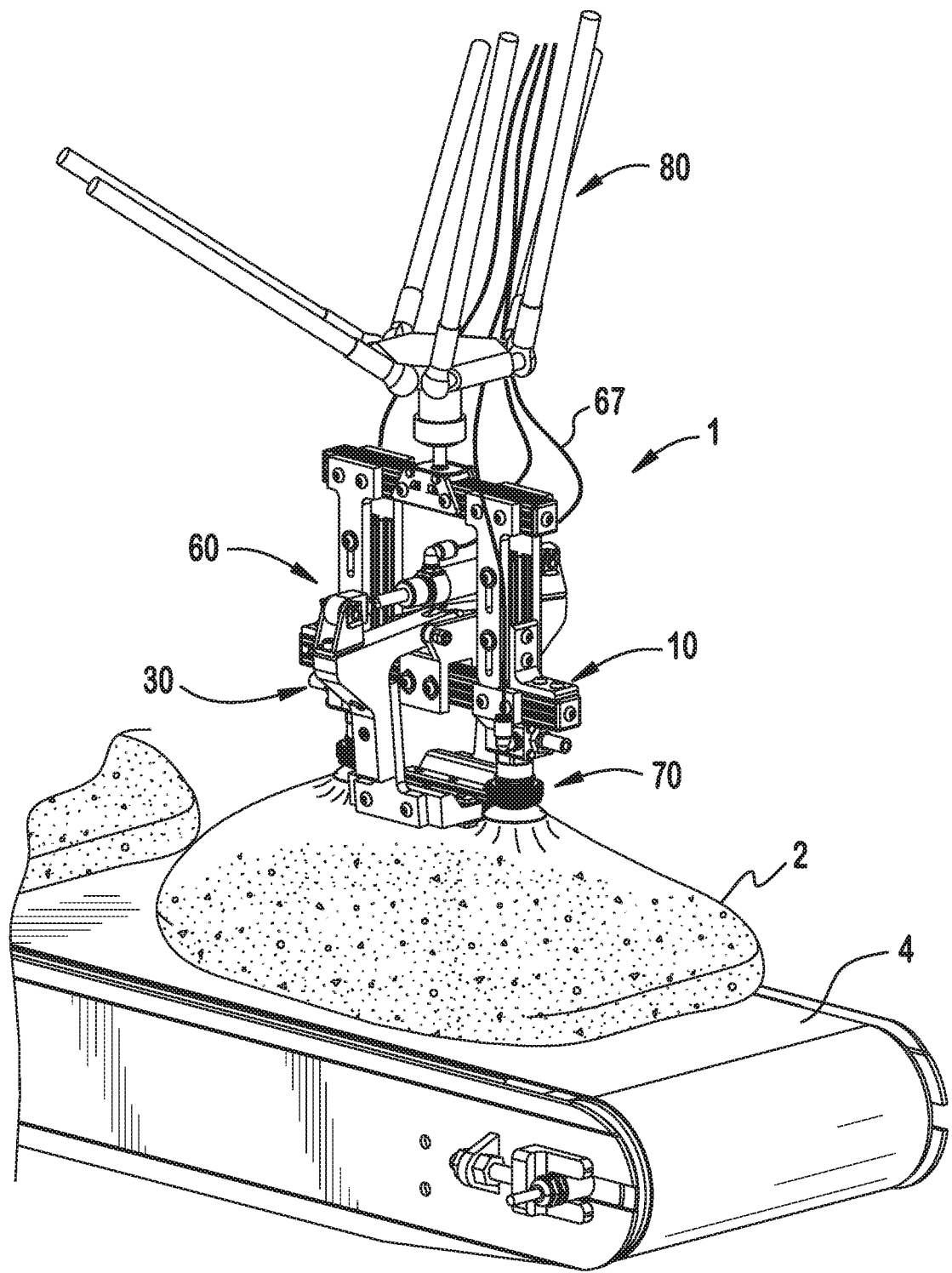
FIG. 1 is a perspective view of a bag gripping device according to the present disclosure, shown attached to a known robotic arm.

Exemplary embodiments of the invention will be described hereinafter in detail with reference to the attached drawings, wherein like reference numerals refer to like elements. The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Now with reference to the figures, an exemplary automated bag gripping assembly according to the present disclosure will be described. With reference to FIG. 1, in an exemplary embodiment of the invention, a gripping device or assembly 1 is used in operation to, for example, move a flexible storage bag of food product 2 from one surface (e.g., a conveyor 4) to another, and more particularly from a stage of a production process to a packaging or storage stage. The exemplary gripping assembly 1 generally includes a frame assembly 10, a hinge assembly 30, a pneumatic assembly 60, a vacuum assembly 70 and a robotic arm assembly 80, the details of which are set forth herein.

Figure 2:
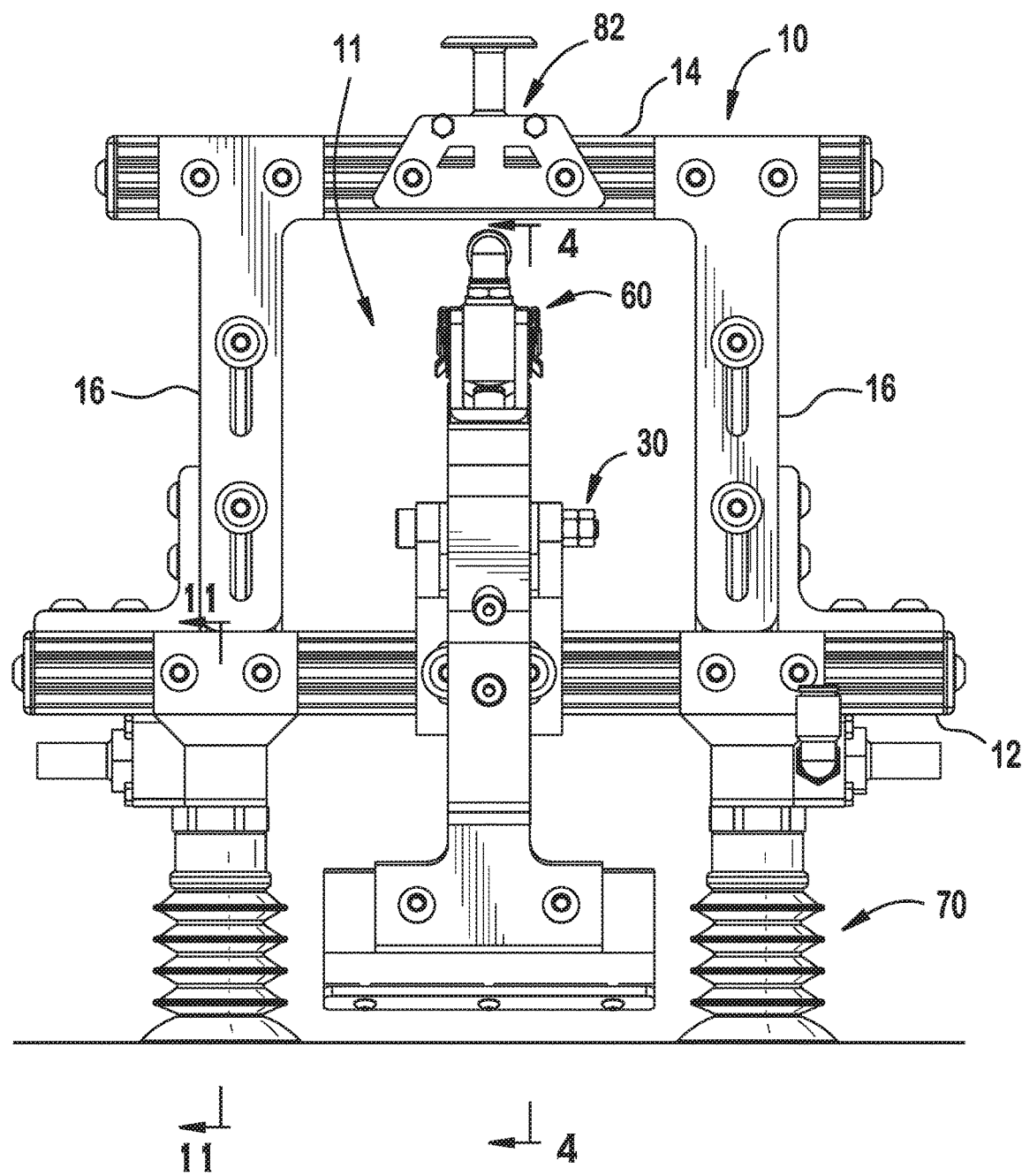
FIG. 2 is a front view of a bag gripping device according to the present disclosure.
Figure 3:
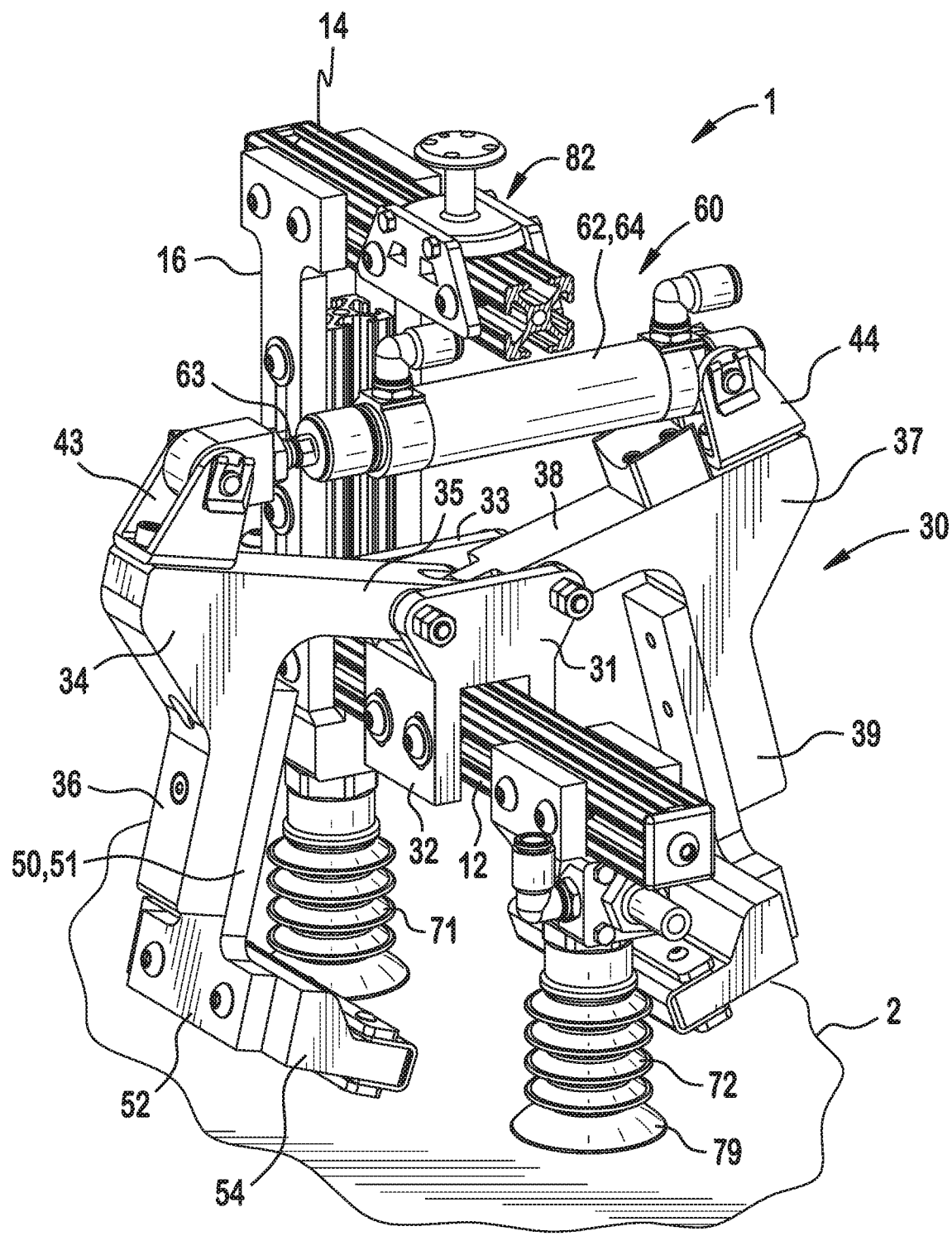
FIG. 3 is a partial perspective view of the bag gripping device of FIG. 2.

As illustrated in FIGS. 1-3, in one embodiment the frame assembly 10 includes a plurality of interconnected frame members including an elongated base member 12, an elongated robotic arm attachment member 14, and a pair of vertically-arranged elongated support members 16 arranged proximate respective ends of the base member 12 and extending generally between the base member 12 and the robotic arm attachment member 14. The frame assembly 10 may define an interior space 11 between the frame member through which portions of the pneumatic assembly 60 and the hinge assembly 30 may be arranged. In the illustrated embodiments, each frame member is a square cross-sectional profile member, wherein a plurality of slots (e.g., "T" slots) are formed in and along each side thereof. The frame members may be formed from extruded material, such as extruded aluminum. As illustrated, the frame members may be attached to one another via a plurality of support brackets or gussets and accompanying fasteners engaged with the respective slots, the details of which have been omitted for brevity herein. Of course, it should be understood that the frame members may be attached to one another by any suitable means, or may be formed wholly or partly monolithically, without departing from the scope of the present disclosure.

Figure 4:
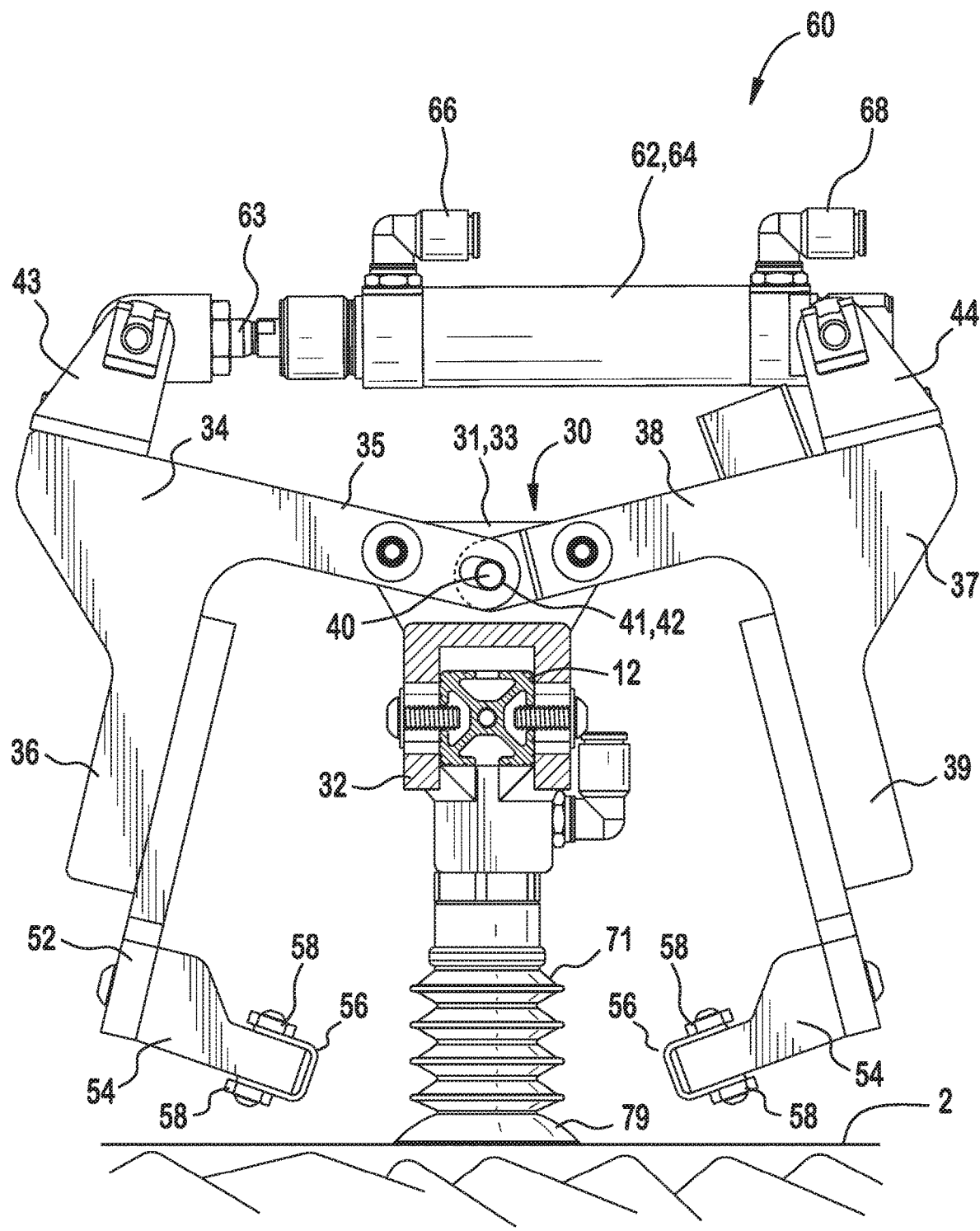
FIG. 4 is a side sectional of the bag gripping device of FIG. 2.

With particular reference to FIGS. 3 and 4, the hinge assembly 30 according to an embodiment of the invention generally includes a pivot bracket 31 having a first end 32 which may be configured as a pair of flanges for attaching to the base member 12. The pivot bracket 31 further includes a second end 33, which also may be configured as a pair of flanges, for accepting and pivotally connecting to a first hinge arm 34 and a second hinge arm 37. The first hinge arm 34, in the shown embodiment, is an "L" shaped arm member having a pivoting arm portion 35 and a clamp mounting portion 36 extending generally perpendicularly from an end of the pivoting arm portion 35. Similarly, the second hinge arm 37, in the embodiment shown, is an "L" shaped arm having a pivoting arm portion 38 and a clamp mounting portion 39 extending generally perpendicularly from an end of the pivoting arm portion 38.

Figure 6:
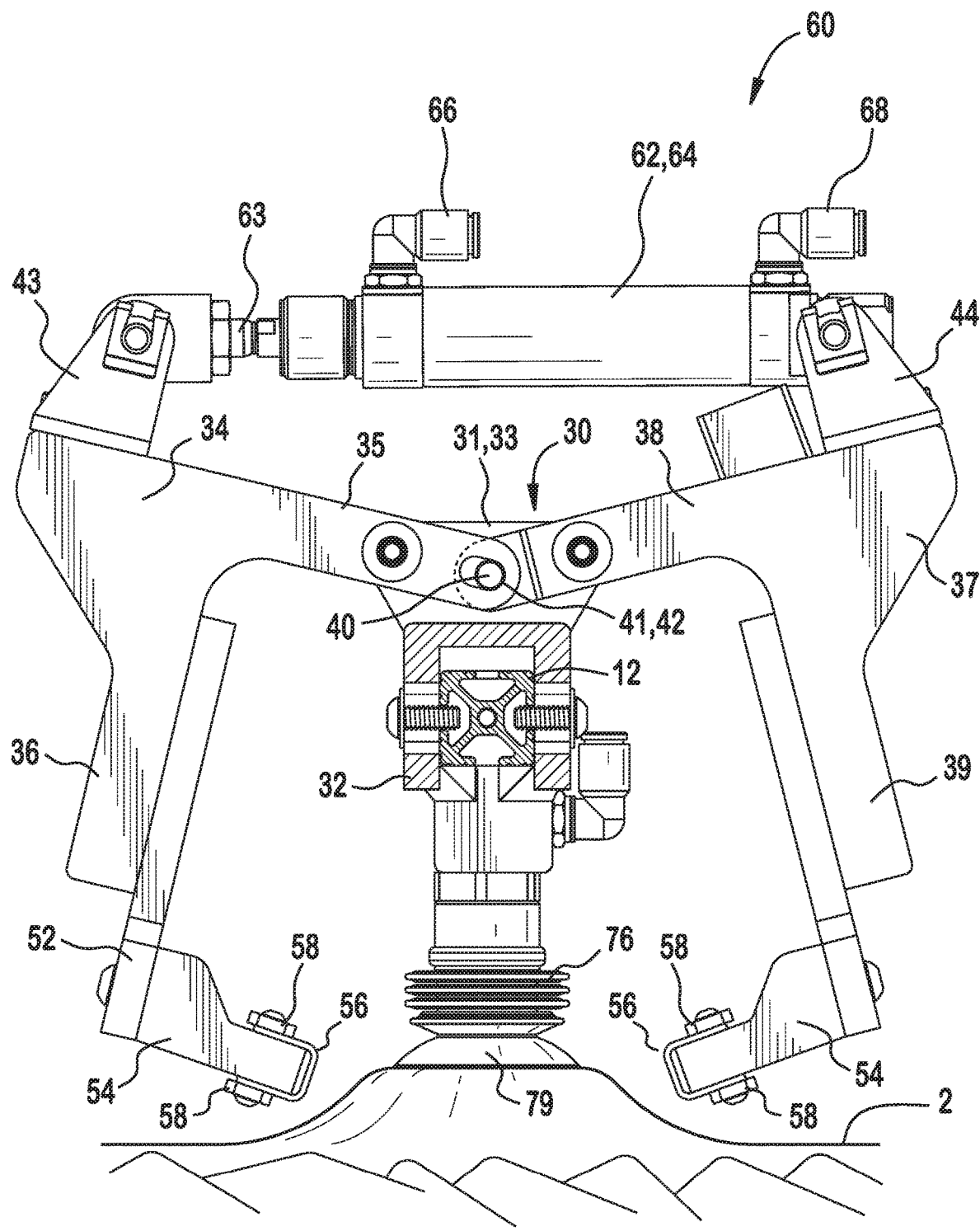
FIG. 6 is a side sectional of the bag gripping device of FIG. 5.
Figure 7:
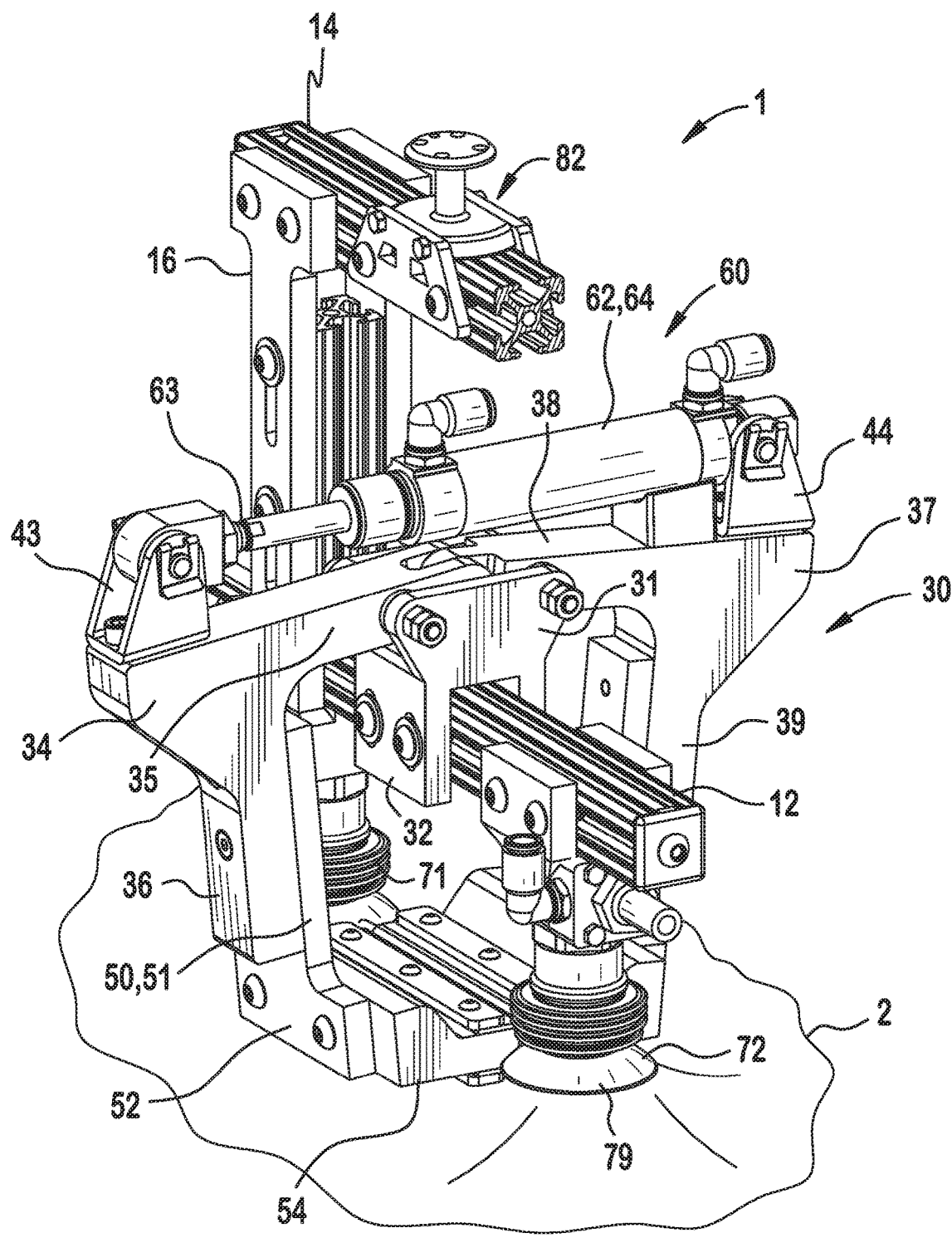
FIG. 7 is a perspective view of the bag gripping device of FIG. 5 upon further activation thereof.

As shown, the first and second hinge arms 34, 37 are each pivotally connected to the pivot bracket 31 via, for example, a shoulder bolt passing through an aperture of each hinge arm 34, 37 and a corresponding aperture of the pivot bracket 31, securing the hinge arms 34, 37 between the flanges of the second end 33. See also FIG. 13. The first hinge arm 34 and the second hinge arm 37 may also be moveably coupled to one another. More specifically, the pivoting arm portion 35 of the first hinge arm 34 may define flanges on an end thereof configured to receive therein a correspondingly sized end of the pivoting arm portion 38 of the second hinge arm 37. A pin 40 may be arranged through respective apertures 41, 42 formed through the ends of the pivoting arm portions 35, 38, such that the first hinge arm 34 and the second hinge arm 37 are pivotally connected. At least one of the apertures 41, 42 may include a slotted or elongated opening, providing a further slideable connection between the first hinge arm 34 and the second hinge arm 37 as the pin 40 translates within the slot. The slotted connection between the first and second hinge arms 34, 37 forms a mechanical stop, limiting the allowable rotation of the first hinge arm 34 and the second hinge arm 37 relative to the pivot bracket 31, as illustrated in FIGS. 4, 6, and 8.

The hinge assembly 30 further includes two similar or identical clamp subassemblies arranged on either end of the clamp mounting portions 36, 39 of the first and second hinge arms 34, 37. Specifically, each subassembly, in the shown embodiment, includes a clamp support bracket 50 configured to attach to one of the clamp mounting portions 36, 39. In the exemplary embodiment, the clamp support bracket 50 includes a "T" shaped bracket including a base 51 connected to one of the clamp mounting portions 36, 39, and a grip mounting portion 52 extending generally perpendicularly from an end of the base 51. Respective gripping members 54 are attached to the grip mounting portions 52, and may extend generally perpendicularly from longitudinal axes of the first and second clamp mounting portions 36, 39. A generally planar clamping face or surface of each gripping member 54 extends generally parallel to a direction of an axis of the base member 12.

Figure 8:
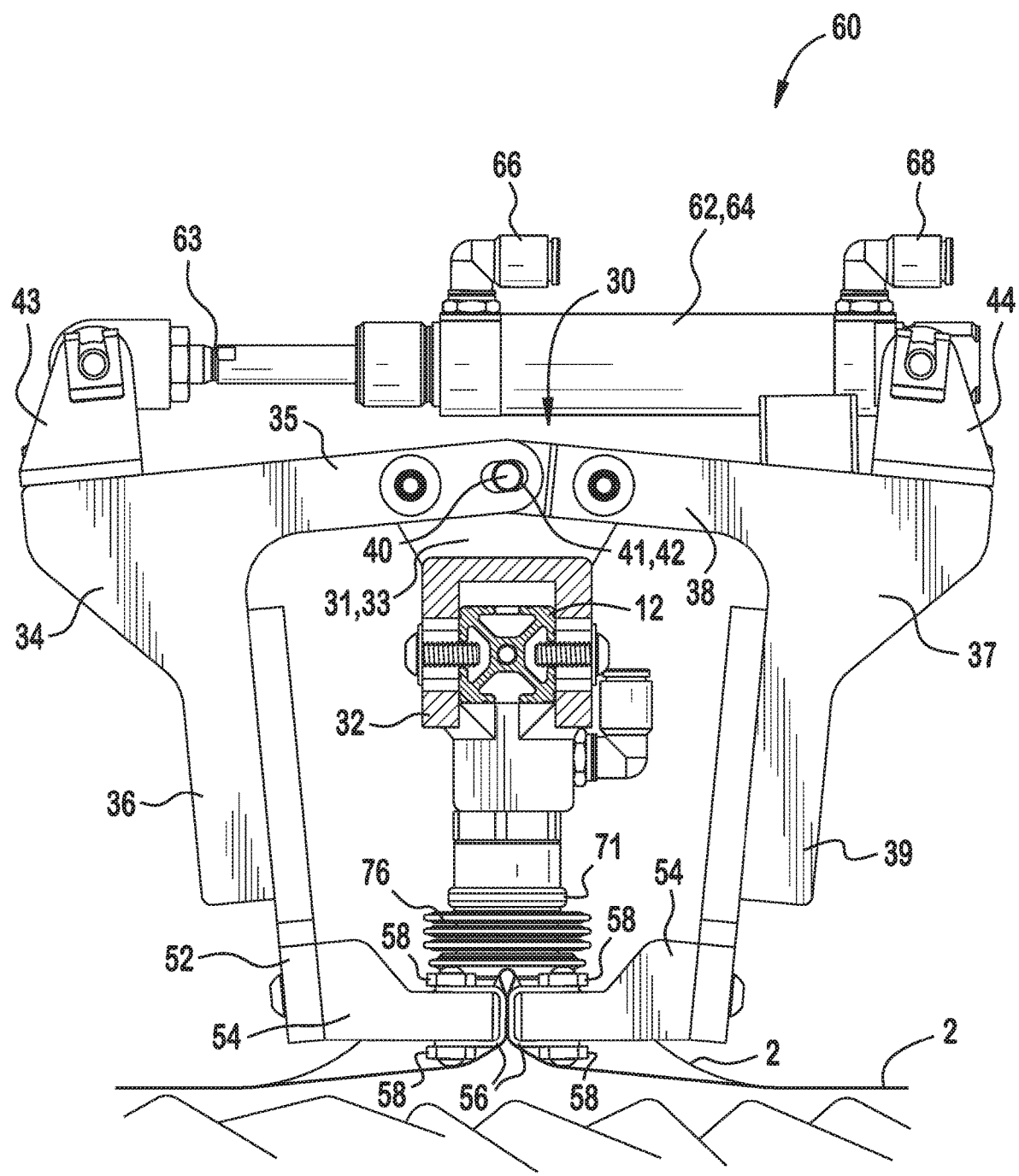
FIG. 8 is a side sectional of the bag gripping device of FIG. 7.
Figure 9:
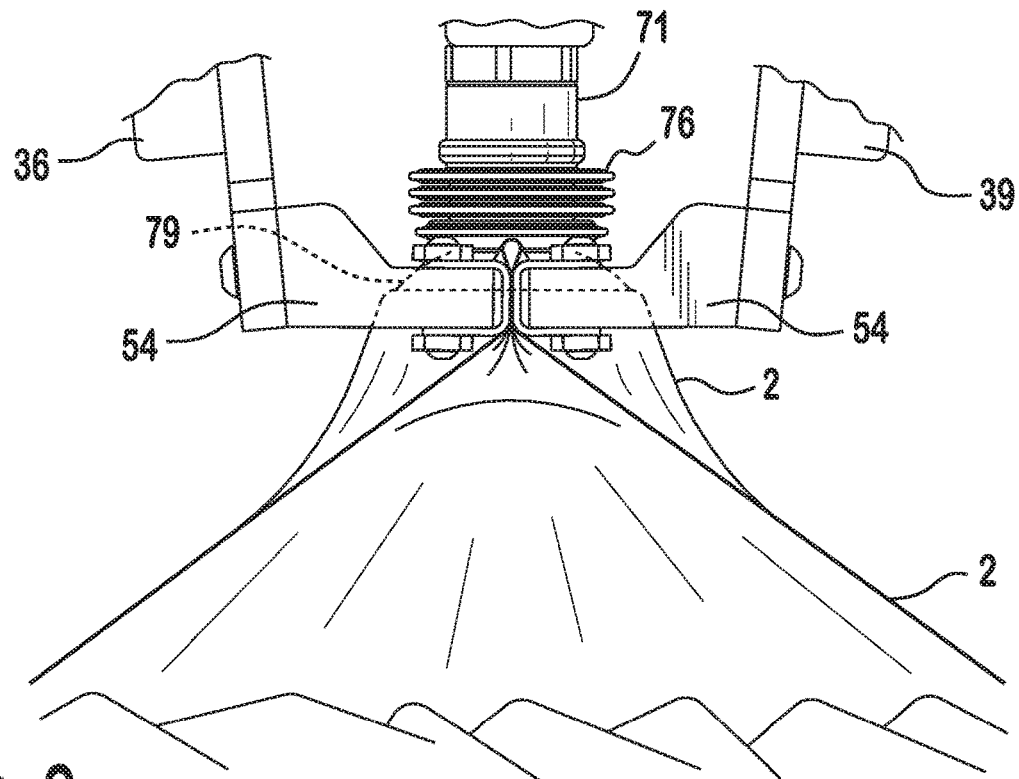
FIG. 9 is a close up side view of the bag gripping device of FIG. 7 upon activation of further activation thereof.
Figure 10:
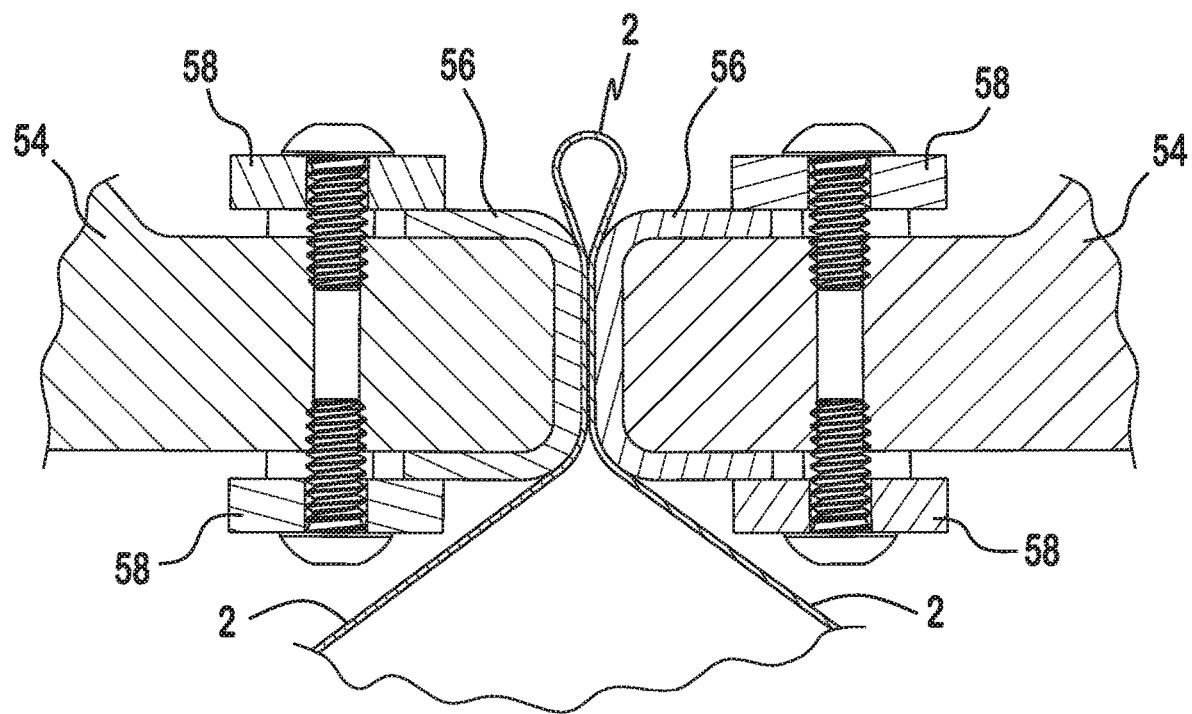
FIG. 10 is a close up of the bag gripping device of FIG. 9 showing gripping of a flexible container between a pair of griping members according to the present disclosure.
Figure 13:
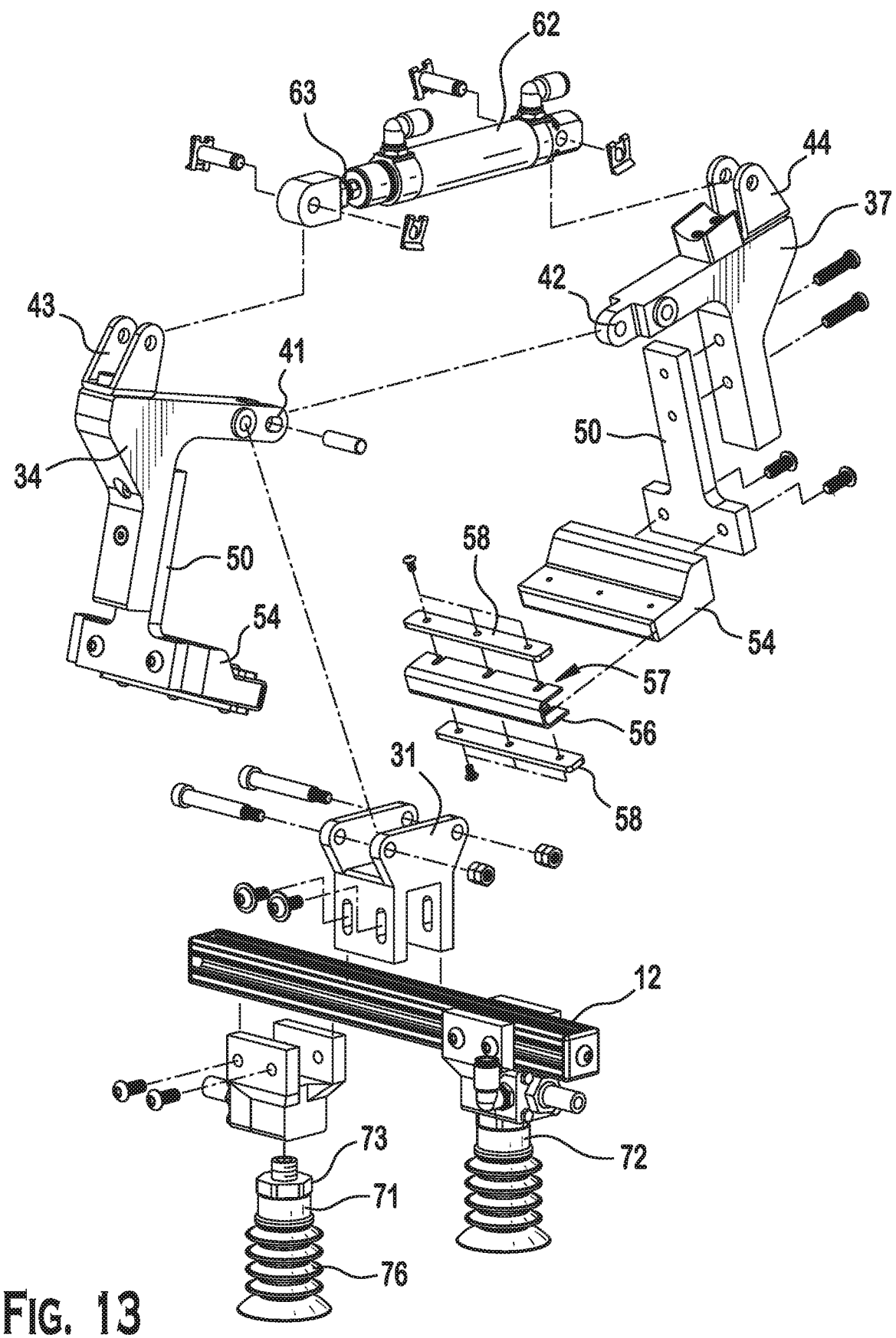
FIG. 13 is a perspective exploded view of a bag gripping device according to the present disclosure.

As shown in more detail in FIGS. 8-10, each gripping member 54 may be fitted with a grip cover 56 arranged over a free end thereof. The grip covers 56 are configured to provide a uniform, high friction surface suitable for safely gripping a product there between, while mitigating damage (e.g., scratches and rips) to the product 2. The grip covers 56 may be formed from any suitable material, for example, rubber, as well as in any suitable size and shape for accommodating differing product types. In the exemplary embodiment, the grip covers 56 are secured in compression to respective ends of each gripping member 54 via a pair of cover plates 58 arranged on either side of the gripping member 54 and associated fasteners. With reference to FIG. 13, the grip covers 56 may include slotted apertures 57 formed therein. In this way, the grip covers 56 may be removed and/or replaced without the need to fully remove the cover plates 58 and associated fasteners from each gripping member 54, facilitating ease of maintenance and repair.

Referring again to FIGS. 3, 4 and 13, the pneumatic assembly 60 generally comprises an actuator 62 (e.g., a linear actuator embodied as a pneumatic cylinder) including a piston 63 moveable with respect to a cylinder 64. The actuator 62 is coupled to the hinge assembly 30 via first and second actuator brackets 43, 44 disposed on and attached to (or formed with) a respective one of the first and second hinge arms 34, 37. Each actuator bracket 43, 44 is configured to connect to and support an end of the actuator 62 of the pneumatic assembly 60. As illustrated, the first actuator bracket 43 is arranged on the first hinge arm 34 and is pivotally connected to an end of the moveable piston 63 of the actuator 62, while the second actuator bracket 44 is pivotally connected to an end of the cylinder 64 of the actuator 62. The actuator 62 is connected to a supply of pressurized fluid (not shown), via the illustrated ports 66, 68 and supply lines 67 (see FIG. 1). As would be understood by one or ordinary skill in the art, the selective application of pressurized fluid to either end of the cylinder 64 of the actuator 62 is operative to extend or retract the piston 63, and in turn pivot the first and the second hinge arms 34, 37 relative to the pivot bracket 31. See FIGS. 6 and 8, for example. While a pneumatic actuator is shown, it should be understood that any suitable type of actuator(s) (e.g., two electric rotary actuators) may be used to achieve the described motion of the first and second hinge arms 34, 37 without departing from the scope of the present disclosure.

Figure 11:
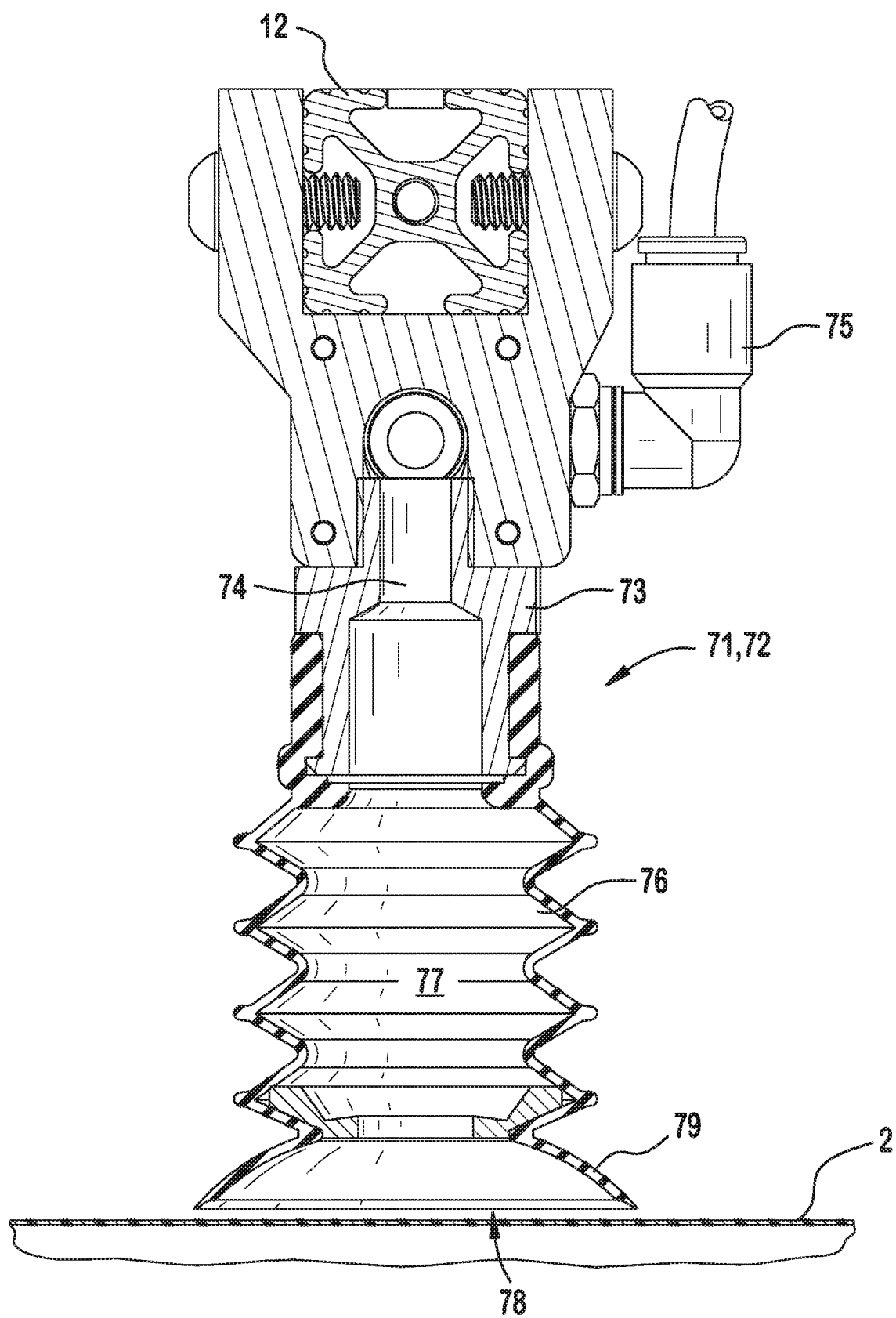
FIG. 11 is a side sectional of the bag gripping device of FIG. 2 showing one of a pair of vacuum elements according to the present disclosure.

With reference to FIGS. 1, 3 and 11, the vacuum assembly 70 is configured to selectively attach to a product to be moved via suction, and generally includes a first vacuum device or element 71 and a second vacuum device or element 72. The vacuum elements 71, 72 may be selectively slideably attached to the base member 12 by the illustrated associated fasteners and accompanying brackets. In one embodiment, the vacuum elements 71, 72 are arranged generally in-line with each other along an axis of the base member 12, or along a plane defined through the axis of the base member 12. It should be understood that the above-described gripping members 14 are configured to converge toward this central plane, and thus, toward a portion of the product 2 raised by and between the vacuum elements 71, 72, as set forth in greater detail herein.

Figure 12:
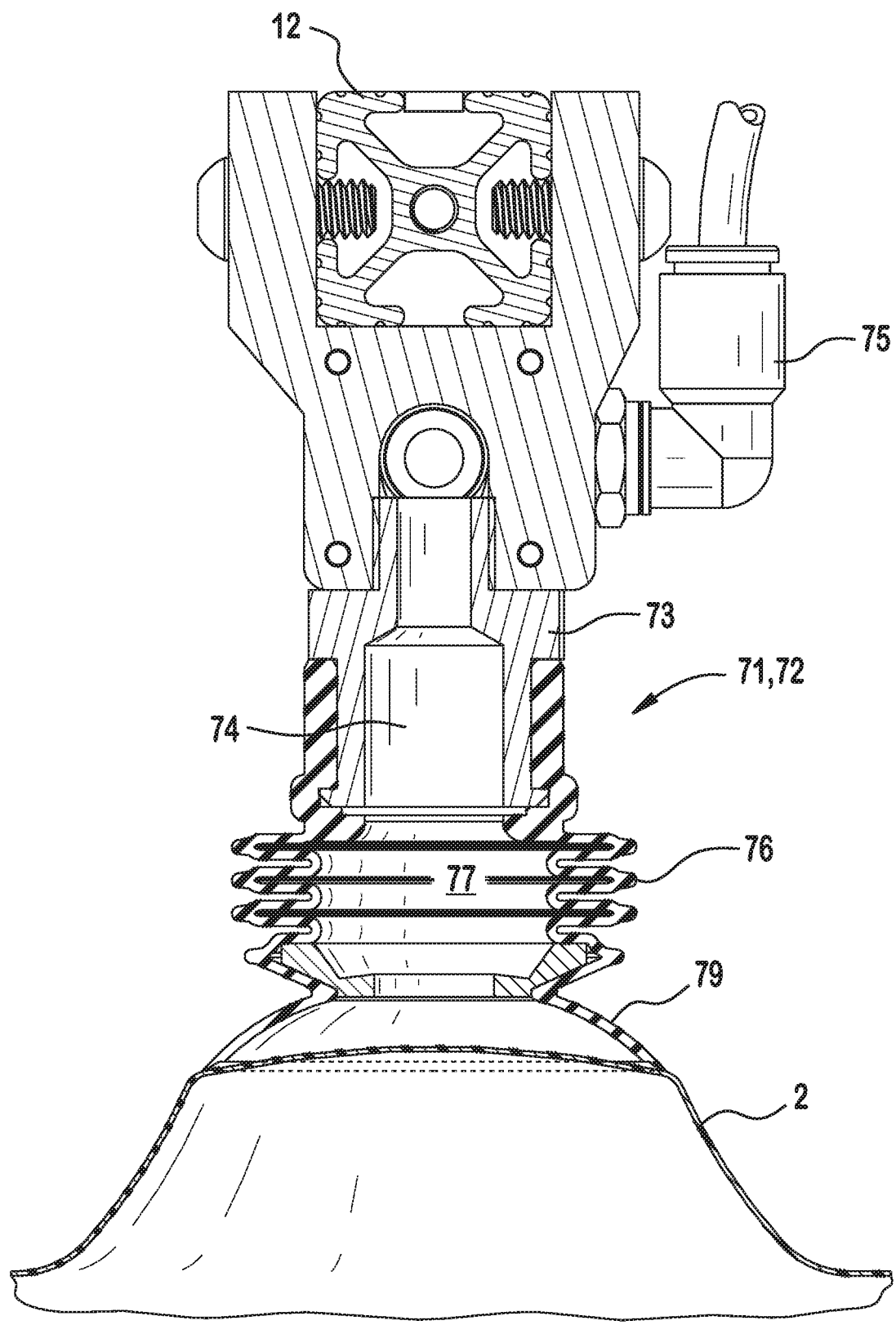
FIG. 12 is another side sectional of the bag gripping device of FIG. 11 showing activation of one of a pair of vacuum elements according to the present disclosure.

Referring to FIGS. 11 and 12, each vacuum element 71, 72 comprises a body 73 defining an aperture 74 formed therethrough. The aperture 74 is placed in selective communication with a source of negative pressure or vacuum, such as a vacuum pump (not shown) via the illustrated port 75. Sealably attached to an end of the body 73 is a flexible bellows 76. The bellows 76 defines an interior space 77 in fluid communication with the aperture 74. A sealing cup 79 of the bellows 76 defines an open end 78, and is configured to form an air-tight or sealable connection with the product 2 to be lifted. As illustrated, once the sealing cup 79 of the bellows 76 is placed into contact with a surface of the product 2, the presence of vacuum pressure within the bellows 76 is operable to create a seal with the product 2, and retract the bellows 76 from an extended or resting position illustrated in FIG. 11, to a contracted or retracted position shown in FIG. 12. As the bellows 76 is contracted, it lifts at least a portion of the product 2 vertically, thereby creating a raised deformation in at least a portion of the product 2 in an area between the vacuum elements 71, 72, which may be more easily and securely captured by the above-described clamping assembly 30. Moreover, as each of the vacuum elements 71, 72 supports some of the weight of the product 2, less strain is put on the product by the clamping assembly 30 during a subsequent lifting and moving operation performed by the robotic arm assembly 80.

Referring again to FIG. 1, the robotic arm assembly 80 includes an articulating arm or arms 81 capable of selective motion along at least three axes. Operation of the robotic arm assembly 80 may be controlled manually, or may be automated, as would be understood by one of ordinary skill in the art. The robotic arm assembly 80 further includes a bracket 82 (see FIGS. 2 and 3) for attaching the robotic arm 81 to the robotic arm attachment member 14 of the frame assembly 10. This attachment may be selectively slideable along the length of the arm attachment member 14 and fixable in place as desired. Further details regarding the structure and function of robotic arm(s) are known in the art, and will not be described in further detail herein for the purpose of brevity.

It should be understood that any or all of the above-described components, including the components of the frame assembly 10 and the hinge assembly 30, may be formed integrally with one another, or may be formed separately, and connected to one another in the illustrated manner without departing from the scope of the present invention. Via the use of slotted frame members, it should be understood that the clamping assembly 30 as well as the components of the vacuum assembly 70 may be slideably repositioned along the length of the base member 12 in any suitable position, facilitating quick and easy reconfiguration of the gripping assembly 1 to, for example, accommodate a plurality of different product types.

A method of lifting a product with a gripping device or assembly according to embodiments of the present disclosure will be described in detail with respect to FIGS. 3-10.

Referring to FIGS. 3 and 4, the gripping assembly 1 may be positioned via the robotic arm assembly 80 over a desired area of the product 2 to be lifted. Once arranged over the product 2, the robotic arm assembly 80 may lower the vacuum elements 71, 72 into contact with a surface of the product 2. The system may utilize positioning technology to determine the position and orientation of the product with respect to the components of the gripping assembly 1. In an embodiment of the invention, an optical positioning system (not shown) uses known cameras, beacons and/or sensors to identify position of the product 2, and then positions the gripping assembly 1 with respect to thereto in the illustrated manner. In a further exemplary embodiment, the optical positioning system uses machine vision to provide imaging-based automatic inspection and analysis for such applications as automatic inspection, process control, and robotic arm guidance.

Figure 5:
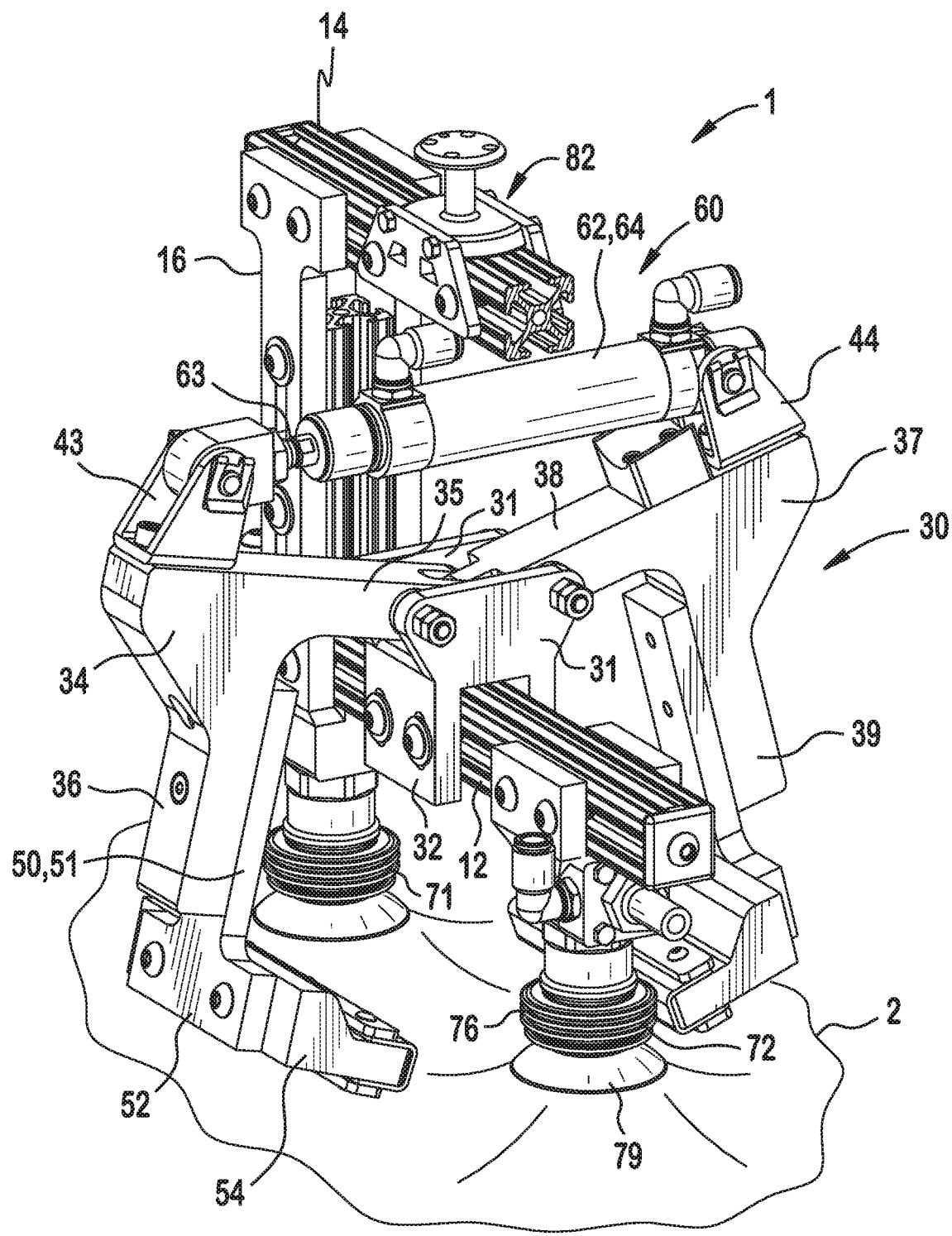
FIG. 5 is a partial perspective view of the bag gripping device of FIG. 2 upon activation thereof.

With reference to FIGS. 4, 5 and 6, the selective application of a vacuum pressure supplied to the vacuum elements 71, 72 creates a suction-induced seal between the sealing cup 79 of the vacuum elements 71, 72 and the product 2. Of course, the application of vacuum may be initiated manually, or by an automated control system, as would be understood by one of ordinary skill in the art. Continued application of vacuum draws the bellows 76 of each of the vacuum elements 71, 72 into a contracted position, lifting adjacent surfaces of the product 2 into an elevated position between the vacuum elements more suitable for clamping or gripping by the gripping members 54 of the clamping assembly 30, as shown in FIGS. 5 and 6.

With reference to FIGS. 7-10, once the product 2 is suitably positioned by the vacuum elements 71, 72, pressurized fluid may be provided to the actuator 62 for biasing the gripping members 54 into a closed or clamping position. The supply of pressurized fluid to the appropriate port of the actuator 62 may be initiated manually, or by an automated control system, as would be understood by one of ordinary skill in the art. As shown in greater detail in FIGS. 9 and 10, a portion of the product 2 (i.e., its bag) is captured securely between the opposing gripping members 54 and covers 56 thereof. With reference to FIG. 9, a remainder of the product 2 not captured by the gripping members 54 remains held by the vacuum elements 71, 72, reducing the stress on the product material held between the gripping members 54 during a subsequent lifting and relocating operation of the product 2 by the robotic arm assembly 80.

In this way, the gripping assembly 1 according to embodiments of the present disclosure enables a user to move the product 2 from a first position to a second position while maintaining its integrity and appearance. As the integrity and appearance of the product is retained, product waste is reduced. As set forth above, embodiments of the present disclosure may be particularly useful for transporting a product from a final stage of a production process to a further packaging or storage stage. However, the gripping assembly described herein may additionally be used at other stages where its capabilities are advantageous.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A robotically-operated gripping device comprising:
    a frame assembly;
    a vacuum device positioned on the frame assembly and configured to selectively attach to and position at least a portion of an object, the vacuum device is configured to lift the object in a vertical direction from a resting position into a clamping position, wherein the vacuum device includes a first vacuum device and a second vacuum device positioned apart from each other along the frame assembly;
    a clamping device positioned on the frame assembly and configured to selectively clamp the object attached to the vacuum device, the clamping device is configured to clamp the object in an area generally between the first vacuum device and the second vacuum device when the object is in the clamping position; and
    a robotic arm configured to selectively position the frame assembly.

2. The robotically-operated gripping device of claim 1, wherein the vacuum device includes a sealing end cup with a flexible bellows extending there from.

3. The robotically-operated gripping device of claim 1, wherein, in response to a supply of negative pressure, the vacuum device is configured to create a seal between the sealing end cup and a portion of the object, and retract the bellows so as to bias the sealing end cup from a resting position to a retracted position.

4. The robotically-operated gripping device of claim 3, wherein the first vacuum device is arranged in-line with the second vacuum device and a clamping surface of the clamping device extends in a direction generally parallel to a direction of a plane defined through the first vacuum device and a second vacuum device.

5. The robotically-operated gripping device of claim 1, wherein the clamping device includes a first clamping arm, a second clamping arm positioned opposite the first clamping arm with respect to the frame assembly, and an actuator configured to selectively bias at least one of the first clamping arm or the second clamping arm between an open position and a clamped position.

6. The robotically-operated gripping device of claim 5, wherein the first clamping arm and the second clamping arm are pivotally connected to the frame assembly.

7. The robotically-operated gripping device of claim 6, wherein the first clamping arm is pivotally and slideably connected to the second clamping arm.

8. The robotically-operated gripping device of claim 6, wherein the clamping device and the vacuum device are selectively slideably connected to the frame assembly.

9. The robotically-operated gripping device of claim 5, wherein the actuator includes a linear actuator.

10. The robotically-operated gripping device of claim 9, wherein a first moveable end of the actuator is pivotally connected to the first clamping arm, and a second end of the actuator is pivotally connected to the second clamping arm.

* * * * *